(No Model.)

W. G. ABEL.
HOSE COUPLING.

No. 290,195. Patented Dec. 18, 1883.

Witnesses: Jas. R. Barker, C. F. Lake

Inventor: William G. Abel
By Joseph Smith, Attorney

N. PETERS, Photo-Lithographer, Washington, D. C.

UNITED STATES PATENT OFFICE.

WILLIAM G. ABEL, OF TITUSVILLE, PENNSYLVANIA, ASSIGNOR OF ONE-HALF TO JAMES R. BARBER, OF SAME PLACE.

HOSE-COUPLING.

SPECIFICATION forming part of Letters Patent No. 290,195, dated December 18, 1883.

Application filed April 9, 1883. (No model.)

*To all whom it may concern:*

Be it known that I, WILLIAM G. ABEL, a citizen of the United States, residing at Titusville, in the county of Crawford and State of Pennsylvania, have invented a new and useful Improvement in Hose-Couplings, of which the following is a specification.

My invention is of utility in coupling any kind of hose or pipes, but is more especially adapted for use where it is impracticable to bring the corresponding ends of pipes provided with any kind of male and female coupling together—as in the case of railroads, where pipes are desired for conveying steam, water, or air from the engine to the cars, or from one car to another—the object of my invention being to construct a coupling device in which the parts shall be neither male nor female, but shall be exactly alike, so that when any two parts are brought together they may be readily united, and at the same time a straight and unobstructed passage be secured for the fluid from one pipe to the other. This I accomplish by the mechanism illustrated in the accompanying drawings, in which—

Figure 1:
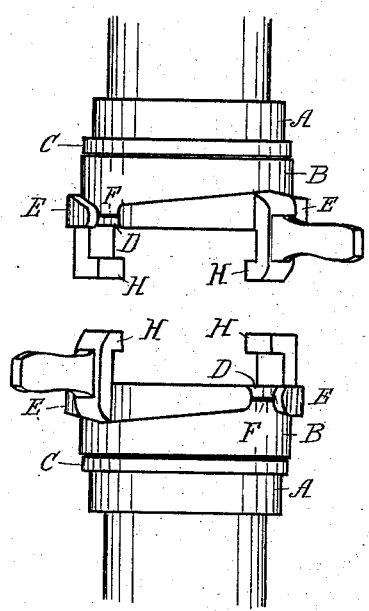
Figure 2:
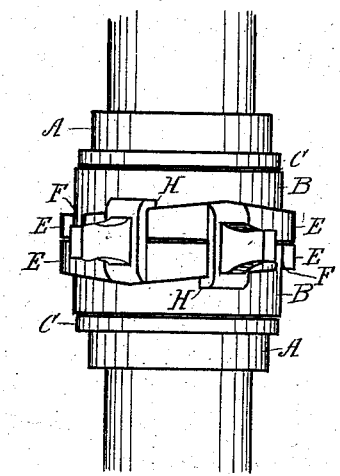
Figure 3:
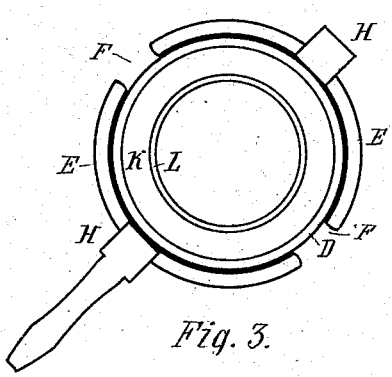

Figure 1 is a view of two sections of pipe, each provided with one part of my coupling device, as being brought together previous to coupling; Fig. 2, a view of the same after being coupled; Fig. 3, a top or end view of one detached part; and Fig. 4, a sectional view of one part, showing my device for holding the packing-ring in place.

Similar letters in the several views refer to similar parts.

A A are the thimbles to which the joints of hose or pipe are attached. As the attachments to each thimble are precisely alike, the construction of one only will be herein described.

B is a loose ring revolving freely around the thimble, but prevented from sliding back and forth by the collars C and D, which collars are firmly attached to the thimble A.

On the two opposite sides of the ring B are placed the double-inclined cams E, each cam being nearly a semicircle, but leaving between the ends of the two the openings F on the opposite sides of the ring B, the said openings being flared in both directions, the flaring shape being formed by rounding off the ends of the cams, as seen in Fig. 1, whereby a more easy entrance and withdrawal of the hooks are effected. The cams project over the ring sufficiently to cover the collar D, the face edge being a plane, the back approaching nearer the face at the two ends and widest at the point midway between the openings F, the object of which double inclination of the cams is to effect the connection of the respective couplings by turning the rings B in either direction, which is a particular advantage when working in a small space, where it frequently occurs that the respective couplings may be partially rotated in one direction only.

To the cams E, and at the point where they are widest, I attach the hooks H, the clear space between the face of the cam and the hook being greater than the less, and less than the greater width of the cam, and with the inward end of the hook on a plane with the outside of the ring B.

A handle is shown in the drawings as projecting from one of the hooks, for convenience of handling. This may be omitted, if desired, and in its stead a device for using a spanner may be substituted.

The operation of coupling is now obvious. The two ends of pipe or hose, each being provided with the device described above, are brought together in the manner shown in Fig. 1, the hooks on the one being held at right angles with those on the other, and the hooks on each passing through the openings F between the cams E on the other, the faces of the two thimbles A are brought together. The rings B being now rotated, the hooks H engage, respectively, with the cams E on the other, and the joint is complete, and the object of a straight and unobstructed passage for the fluid is secured.

Figure 4:
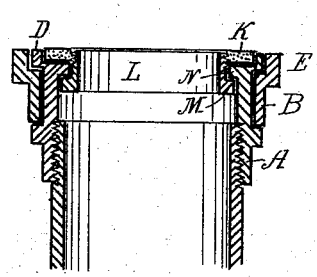

For the packing of the joint thus formed a packing-ring, K, Fig. 4, is placed in a recess in the face of the thimble A, and to retain this packing-ring in place I employ the device of the short nipple L, having a shoulder, M, engaging with the internal shoulder, N, on the inside of the thimble A. The nipple L is provided with a thread on its exterior surface, and on this the packing or gasket ring K is placed and screwed down to place, thus holding both the nipple and gasket in place. The packing-ring being slightly thicker than the depth of the recess in the thimble, it projects beyond the collar D and the end of the nipple L. When the two joints are brought together for coupling, as the thimble does not revolve, there is no abrasion of the surface of the packing-ring in its contact with its fellow, and greater durability is secured.

As I am aware it is not broadly new to employ a ring provided with cam-surfaces and hooks adapted to engage such surfaces, in combination with a thimble or sleeve fixed to a hose, I would not, therefore, have it understood that I am intending to claim such, broadly, as my invention; but What I do claim is—

1. In a hose-coupling, the combination, with a thimble secured to the hose, provided with circumferential collars and an internal collar, of the nipple having a circumferential flange and a screw-thread, the gasket secured thereon and fitting within one of the collars of the thimble, and the loose ring fitting between the said circumferential collars, having approximately semicircular double-inclined cams provided with diametrical openings and intermediate hooks carrying handles projecting from their widest part, whereby the couplings may be united by a partial rotation in either direction, substantially as shown and described.

2. In a hose-coupling, the combination, with the fixed thimble provided with an external outwardly-extending collar and an internal collar, of a nipple having an external collar, and adapted to fit within the said internal collar, an external screw-thread, and the gasket secured thereon and fitting within the said external collar of the thimble, substantially as shown and described.

3. In a hose-coupling, a coupling-ring provided with two approximately semicircular double-inclined external cams divided by diametrical flaring openings, and provided each with hooks extending from the widest portion of the cams and having each a handle, substantially as shown and described.

WILLIAM G. ABEL.

Witnesses:
SAMUEL GRUMBINE,
BARNARD ABEL,
FRANK M. DUNBAR.